United States Patent [19]
Engalitcheff, Jr. et al.

[11] 3,922,153
[45] Nov. 25, 1975

[54] INJECTOR TYPE LIQUID COOLING APPARATUS

[75] Inventors: John Engalitcheff, Jr., Gibson Island; Wilson E. Bradley, Jr., Ellicott City; Edward N. Schinner, Silver Spring, all of Md.

[73] Assignee: Baltimore Aircoil Company, Inc., Jessup, Md.

[22] Filed: Mar. 6, 1974

[21] Appl. No.: 448,758

[52] U.S. Cl. .................. 55/257; 55/440; 55/357; 55/418; 261/116
[51] Int. Cl. ............................... B01d 47/06
[58] Field of Search ......... 55/227, 228, 84, 85, 240, 55/241, 357, 257, 260, 440, 418; 261/116–118, 3, 5, DIG. 11

[56] References Cited
UNITED STATES PATENTS

| | | |
|---|---|---|
| 3,290,867 | 12/1966 | Jacir .................................. 55/440 |
| 3,437,319 | 4/1969 | Engalitcheff, Jr. et al. . 261/DIG. 11 |
| 3,785,625 | 1/1974 | Engalitcheff ....................... 261/116 |
| 3,785,626 | 1/1974 | Bradley, Jr. et al. ................. 55/257 |

*Primary Examiner*—Bernard Nozick
*Attorney, Agent, or Firm*—Michael C. Sudol, Jr.

[57] ABSTRACT

An injector type cooling apparatus is disclosed wherein multiple flat liquid sprays are directed into a conduit of uniform cross section to draw cooling air into and through the conduit for mixture with and heat transfer from the liquid. Air flow control strips are provided at the conduit inlet along with a special turbulence reducing air inlet slot. Also described is a dual level liquid collection means.

25 Claims, 5 Drawing Figures

INJECTOR TYPE LIQUID COOLING APPARATUS

BACKGROUND OF THE INVENTION

1. Field of the Invention

This invention relates in injector type cooling towers in which a liquid to be cooled is sprayed into a conduit to induce cooling air flow through the conduit along with the liquid. These devices are sometimes called ejector type cooling towers. More specifically, the invention is concerned with novel arrangements for stabilizing air flow through the conduit, and for achieving liquid-air separation toward the outlet end of the conduit.

The novel air flow stabilizing means for the present invention isolates the incoming air stream from the effects of changes in wind direction. Further, according to a preferred embodiment, when the operating conditions are such that the water sprays are not of sufficient intensity, these same air flow stabilizing means operate to prevent loss of liquid due to blowback of air out through the inlet end of the conduit, during adverse wind conditions. Thus with the novel air flow stabilizing means of the present invention it is possible to operate an injector type cooling tower in the open atmosphere and under any wind conditions without need for scoops, shields, or similar bulky structures connected to the exhaust end of the device.

The novel liquid-air separation means of the present invention provides a high degree of separation of the sprayed liquid from the induced air without appreciable interference with air flow. Further, the liquid-air separation means permits a large amount of water to be accommodated in a limited region.

2. Description of the Known Prior Art

Injector type cooling towers in which the present invention may be used are shown and described in U.S. patent application Ser. No. 144,853, filed May 19, 1971, now U.S. Pat. No. 3,807,145. As shown therein, water to be cooled is sprayed via a plurality of nozzles into a conduit open at both ends to the atmosphere. The spray ingests atmospheric air into the conduit in admixture with the water. The air cools the water by both sensible and evaporative heat transfer. The air and water are separated at the downstream end of the conduit by means of curved liquid-air separator strips which intercept the water droplets and increase their gravity component so that the water flows down along the strips to a recovery sump below them.

Incoming air flow control means are shown in U.S. Pat. Nos. 3,360,906; 3,608,274 and in U.S. Patent application Ser. No. 144,853, filed May 19, 1971. In U.S. Pat. No. 3,360,906, spaced apart perforated baffles are provided to support the outer edge of a cooling tower shell. These baffles, however, are incapable of isolating the incoming air stream from the effects of changes in wind direction. In U.S. Pat. No. 3,608,274, airfoil shaped vanes are provided as manifolds through which a liquid to be sprayed may pass. These airfoil shaped vanes, however, reduce the effective cross section of the air conduit inlet and require a speedup of air upstream of the spray nozzles. In U.S. patent application Ser. No. 144,853, vanes are shown upstream of a spray nozzle. These vanes, however, are not placed in sufficient alignment and proximity with the spray nozzle to produce the inlet air flow control achieved with the present invention.

Prior art liquid-air separation means are shown in above mentioned U.S. patent application Ser. No. 144,853. These liquid-air separation means comprise a plurality of elongated upstanding strips arranged parallel to each other and distributed across the cross section of the conduit to define a plurality of slot like passageways extending out from its discharge end. The strips have corrugations to cause lateral deflection of the sprayed liquid droplets so that the gravity component of their momentum is increased relative to their forward component, and the droplets therefore collect upon and flow down the strips while the air from the conduit continues to flow out between the strips. In order to increase the liquid handling capacity of the strips, the arrangements of the above identified application Ser. No. 144,853 include the provision of tilted strips and the provision of two cooling conduits mounted one above the other, each with its own spray means and each having its own liquid collection means.

SUMMARY OF THE INVENTION

According to a first aspect of the present invention there is provided, in an injector type evaporative cooling device, an air flow stabilizing means comprising a plurality of closely spaced parallel strips of uniform thickness immediately upstream of the spray nozzles with their plane surfaces essentially parallel to the spray direction of the nozzles. Preferably, the nozzle sprays are of essentially flat, fan shaped configuration lying in planes parallel to the surface planes of the strips. Further, in the preferred embodiment the strips are corrugated so that in the event of air blowback out through the conduit air inlet under adverse wind conditions the strips will also serve as mist eliminators. Thus the need for large protective structures such as scoops, etc., at the exhaust end of the device, is avoided. In the preferred embodiment there is also provided an air inlet slot in the conduit just downstream of the inlet air flow control strips so that additional air can flow into the conduit and so that eddy free flow can be maintained in the upstream region where the liquid sprays first impinge on the walls of the conduit. This additional air flow also serves to increase the cooling capacity of the system.

According to a second aspect of the invention there are provided novel arrangements for increasing the capacity of the liquid-air separation means so that the spaces between the strips do not become so flooded with water that air flow between them becomes restricted. This is accomplished in the present invention by the provision of plural banks of separator strips positioned one above the other with separate liquid collection trays arranged under each bank of strips. Water collected in the upper liquid collection trays is directed down to a common water collection sump so that the water from the upper banks of strips does not flood the lower banks.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other arrangements for carrying out the several purposes of the invention. It is important, therefore, that this disclosure be regarded as including such equivalent arrangements as do not depart from the spirit and scope of the invention.

BRIEF DESCRIPTION OF THE DRAWINGS

Various embodiments of the invention have been chosen for purposes of illustration and description, and are shown in the accompanying drawings, forming a part of the specification, wherein.

DESCRIPTION OF THE PREFERRED EMBODIMENTS

Figure 1:
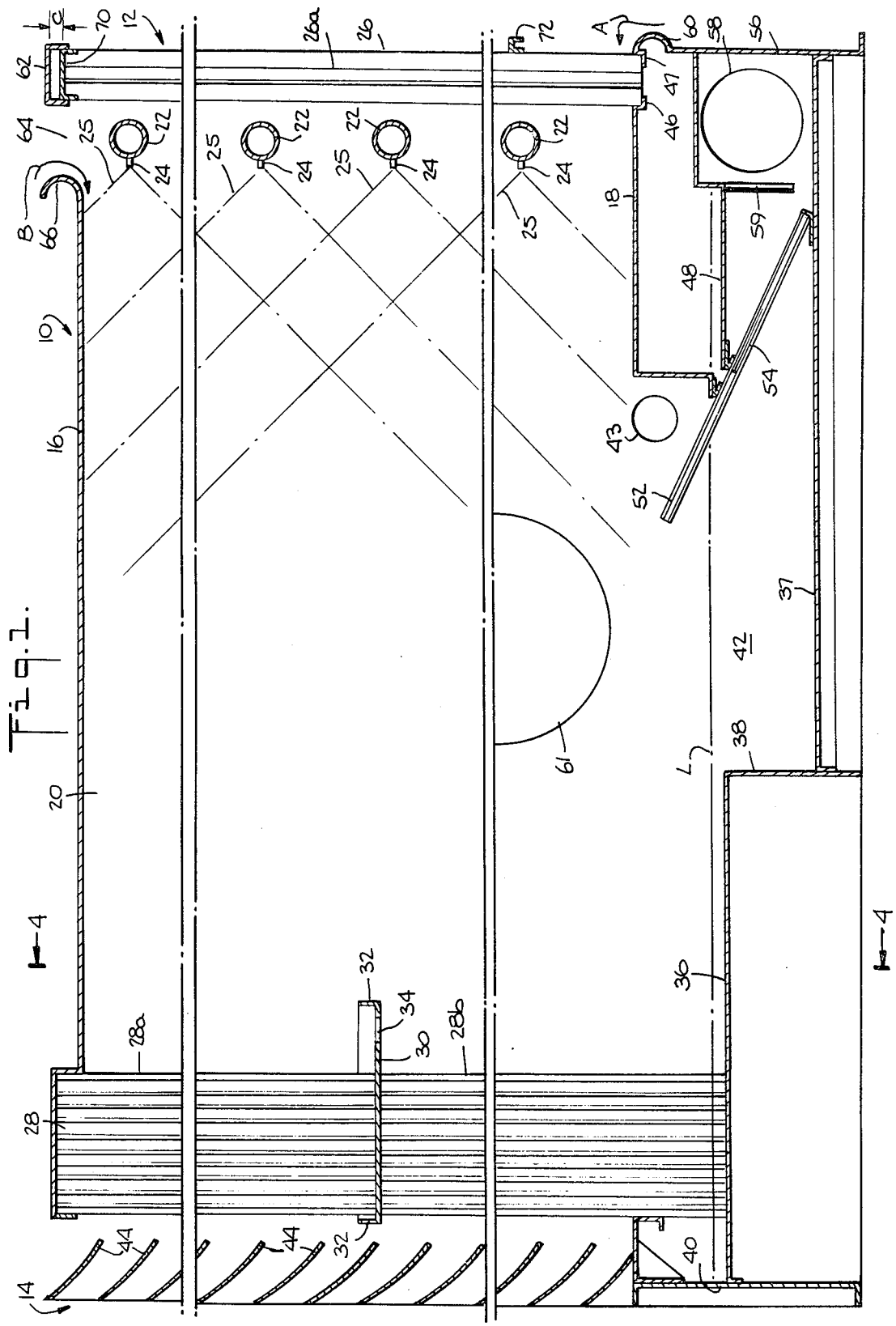
FIG. 1 is a side elevational view, taken in section and partially cut away, of an ejector type water cooling system in which the present invention is embodied.
Figure 2:
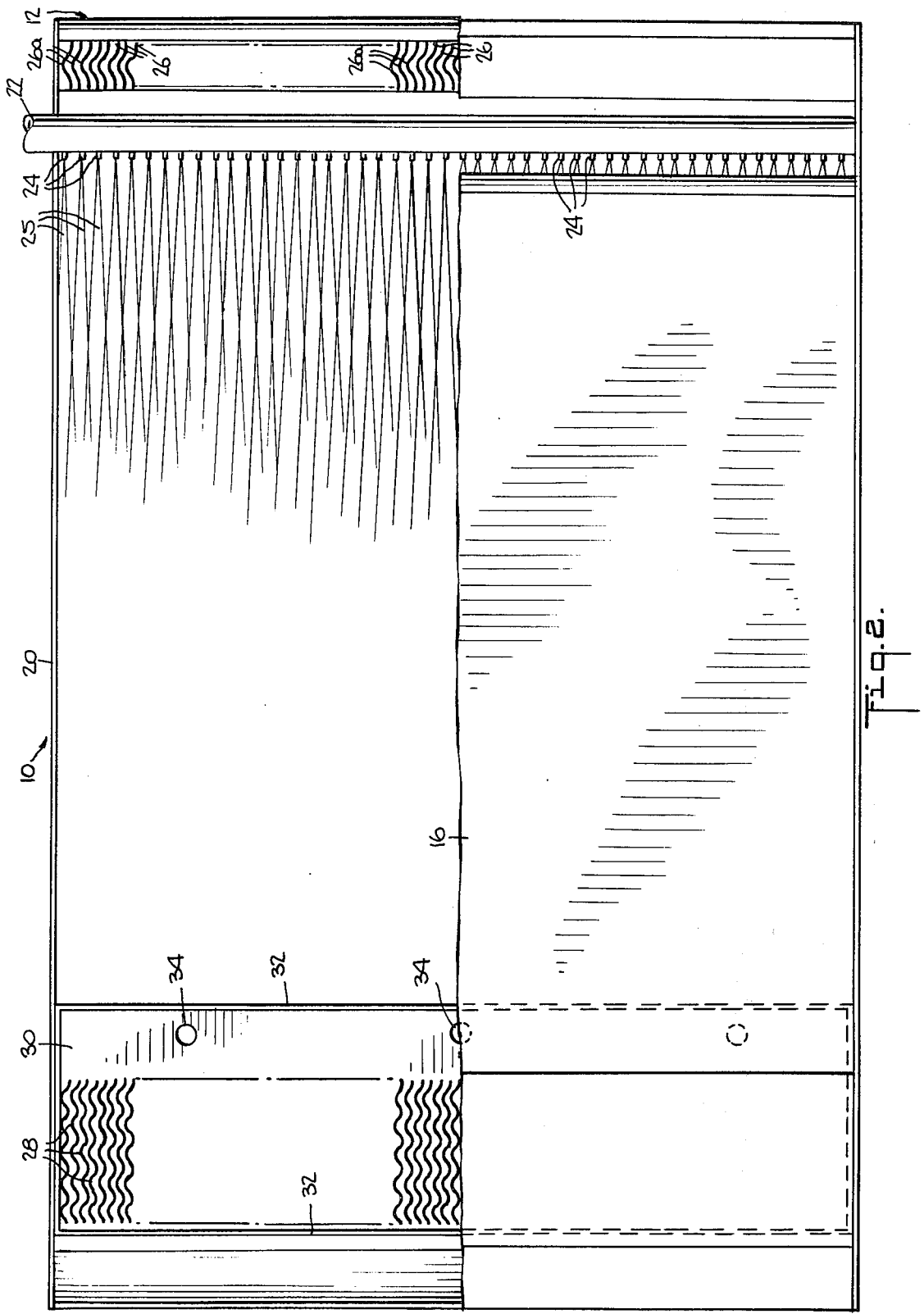
FIG. 2 is a top plan view, partially cut away, of the water cooling system of FIG. 1.

The injector type cooling tower of FIGS. 1 and 2 comprises a conduit 10 formed of sheet material and having a generally rectangular cross section of uniform dimensions throughout its length. The conduit 10 has an air inlet end 12 and an air outlet end 14 both open to the atmosphere. Between these two ends, the conduit 10 is made up of a top wall 16, a bottom spray seal plate 18 and the horizontal extension thereof, and side walls 20.

A plurality of water supply manifolds 22 extend parallel to each other horizontally across the conduit interior near the air inlet end 12. Water to be cooled is pumped by external means (not shown) to these manifolds. A plurality of spray nozzles 24 are provided at spaced apart locations on each of the manifolds 22 and these spray nozzles are aimed to project sprays of water 25 into the conduit 10 toward its air outlet 14.

Figure 3:
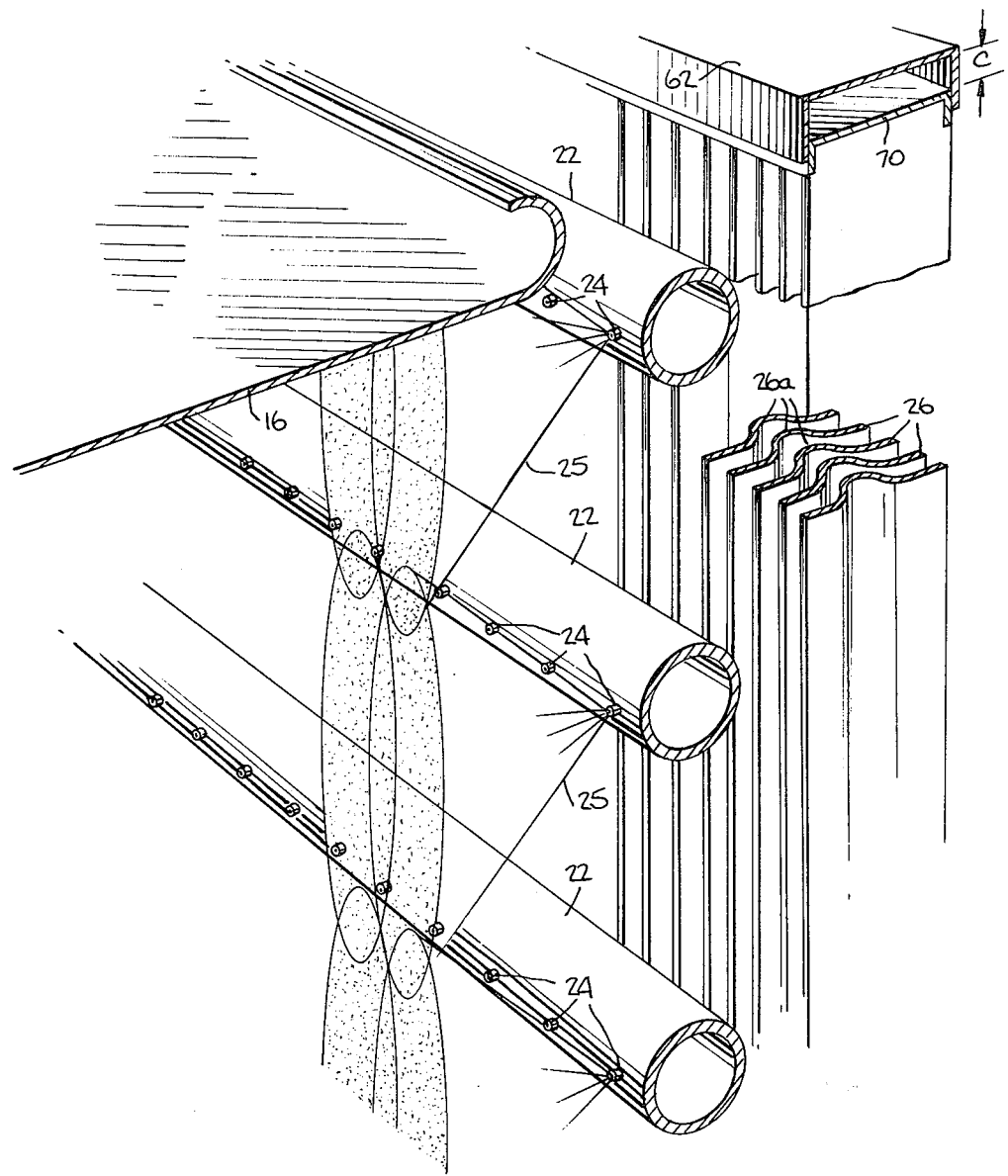
FIG. 3 is a fragmentary perspective view of a nozzle and inlet air control strip arrangement forming a portion of the embodiment of FIGS. 1 and 2.

Turning now to FIG. 3, it will be seen that the water sprays 25 from the nozzles 24 are of generally flat, fan shaped configuration. That is, the sprays diverge much more extensively in the vertical direction than in the horizontal direction. As pointed out in previously mentioned U.S. patent application Ser. No. 144,853, this serves to maximize cooling and air entrainment. The nozzles of each conduit are aligned with corresponding nozzles in the other conduits.

At the air inlet end 12 of the conduit 10, as shown in FIGS. 1 and 2, there are provided a plurality of closely spaced vertical air flow stabilizing strips 26 distributed across the conduit cross section just upstream of the water supply manifolds 22. These inlet air stabilizing strips are of thin sheet material and they are positioned to lie in planes which are essentially parallel to the planes of the sprays from the nozzles 24. The strips 26 are formed with at least one corrugation 26a and these corrugations are aligned with each other so that the strips are spaced apart with minimal overlap of these corrugations 26a.

Also as shown in FIGS. 1 and 2, there are provided a plurality of spaced apart liquid-air separator strips 28 near the air outlet end of the conduit 10. These separator strips also are of sheet material and they are positioned to lie in vertical planes distributed across the conduit cross section.

Figure 4:
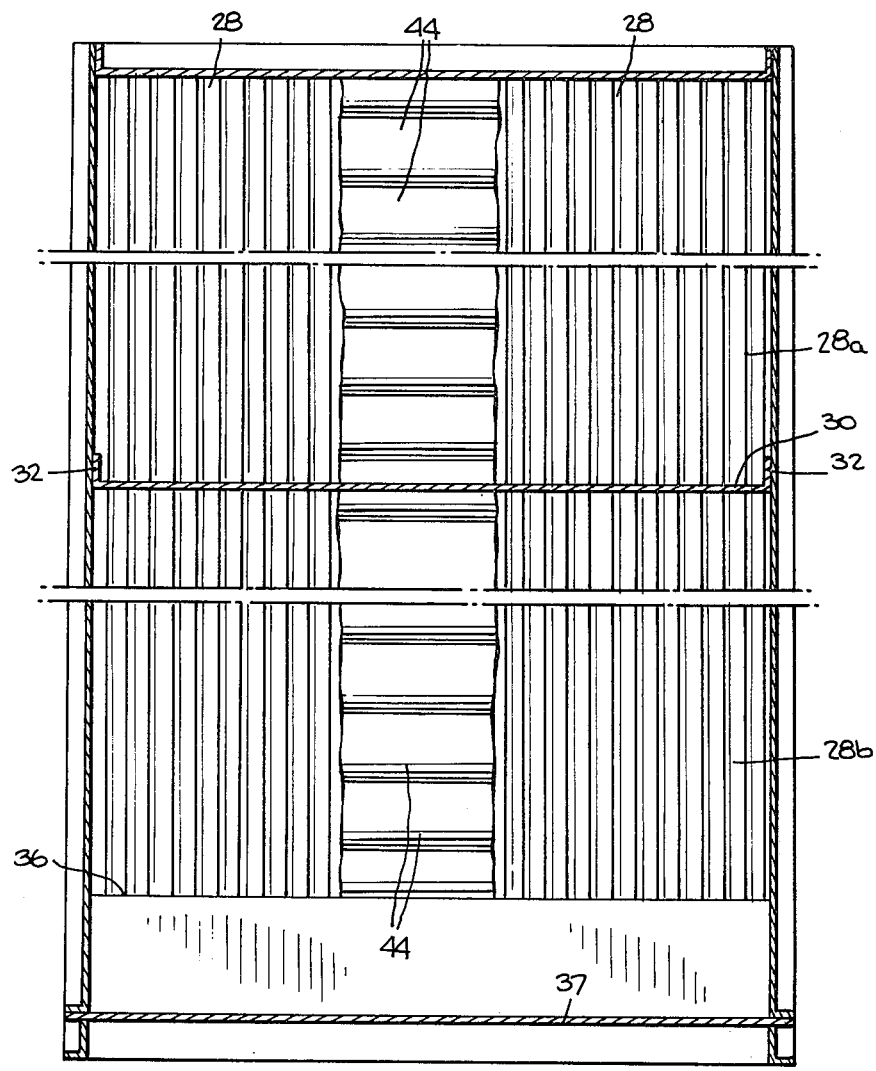
FIG. 4 is an end view partially cut away, taken along line 4—4 of FIG. 1.

An upper water collection shelf 30 extends horizontally across the conduit 10 in the region of the liquid-air separator strips 28. As shown in FIG. 1 this shelf passes through the separator strips to divide them into upper and lower banks 28a and 28b. The shelf 30 is provided around its edge with short upstanding walls 32 which cooperate to form a shallow tray. As shown in FIGS. 1, 2 and 4, bypass openings 34 are provided in the bottom of the tray to allow water collected therein to pour down to a lower water collection shelf 36 just under the lower bank 28b of liquid-air separator strips.

The lower water collection shelf 36 is supported a short distance above a bottom wall 37 by vertical walls 38 and 40. A sump 42 is formed immediately below the conduit 10. The lower extent of the sump is defined by the bottom wall 37 and the lower water collection shelf 36, and the upper extent is defined by the level of the water contained therein.

The wall 40 extends up higher than the shelf 36 and serves to prevent water from flowing forwardly out of the sump 42. As shown by the phantom line L, the water level in the sump 42 is normally maintained slightly above the level of the shelf 36. An overflow outlet 43, near the other end of the unit prevents this water level from rising too high.

A plurality of curved turning vanes 44 extend horizontally across the conduit 10 downstream of the liquid-air separator strips 28. These turning vanes are curved upwardly from the horizontal; and they serve to deflect moisture laden air exiting from the conduit 10 up and away from the conduit so that it cannot be recirculated back into the inlet end 12. It will be appreciated that these turning vanes are open to the atmosphere and that no special protective structures such as scoops, baffles or the like, are used.

The air flow stabilizing strips 26 are supported at their lower ends by means of brackets 46 and 47 located just above a strainer cover 48. The forwardmost bracket 46 is integral with the bottom spray seal plate 18. The downstream ends of the strainer cover 48 and the bottom spraying seal plate 18 are connected to slanted guide brackets 52 which hold a strainer 54. The manner in which this strainer arrangement operates to provide improved water straining is described in a copending application Ser. No. 448,760, filed Mar. 6, 1974, in the name of Edward N. Schinner. As can be seen in FIG. 1, the sump 42 extends under the conduit 10 and through the strainer 54 to an inlet end support wall 56. A water outlet port 58 is provided in one of the conduit side walls 20 just under the strainer cover 48. This outlet port 58 is connected to external conduit means (not shown) to convey the cooled water to various utilization means. As will be seen more fully hereinafter, the strainer cover 48 serves to direct water which flows down the strips 26 forwardly and in front of the strainer 54 so that it will flow through the strainer before exiting from the device. A tapered liquid flow control plate 59 extends across the sump 42 between the strainer 54 and the water outlet port 58. This plate extends from the bottom of the strainer cover 48 to a level close to the bottom wall 37 near the outlet port 58; and it tapers up to progressively higher levels toward the opposite side of the device. This restricts the flow of water to a greater extent in the region of the outlet port 58 and thereby serves to maintain an even flow of water through the strainer 54 in all regions thereof. An access door 61 is provided formed in one of the side walls of the device to permit entry into the interior of the device for repair and cleaning of various components and for replacement of the strainer 54.

A curved lower air inlet lip 60 extends across the conduit air inlet end 12 along the lower ends of the air flow stabilizing strips 26. This curved lip serves to maintain a smooth eddy free flow of air into the lower regions of the conduit.

An upper support channel 62 maintains the upper ends of the air flow stabilizing strips 26 in position. Just downstream of the bracket 62 there is provided an upper air inlet slot 64 which extends across the top of the conduit 10 to a location slightly past the water supply manifolds 22. The top wall 16 of the conduit is curved up and back to form an upper air inlet lip 66 along the downstream edge of the slot 64. This slot and lip arrangement serves to improve and increase inlet air flow and to prevent ice formation as will be explained more fully hereinafter.

In operation of the system, water to be cooled is pumped into the water supply manifolds 22 and is sprayed out through the nozzles 24 into the conduit 10. These sprays, as pointed out above, are of generally flat, fan shaped configuration lying in parallel vertical planes. The sprays from the different nozzles intersect with each other downstream of the nozzles and the outermost sprays contact the conduit walls in the same region so that there is formed a pressure seal across the conduit cross section. The momentum of the sprays causes air to be drawn in between the air flow stabilizing strips 26 and through the upper air inlet slot 66. This air is thoroughly mixed with and is carried along by the sprays as they pass through the conduit. At the downstream end of the conduit the air and water are separated as the water impinges upon and flows down along the surface of the strips 28 while the air continues to flow out between them.

The amount of water sprayed through the nozzles is varied by changing the pressure in the manifolds 22. The amount of water sprayed through the nozzles is also varied by changing the size of the nozzle orifices. The amount of variation which can be accepted for the particular nozzle arrangement is limited by the ability of the liquid-air separator means to provide effective operation with minimal liquid loss due to overflooding. Under conditions of operation where the liquid-air separator strip means become overflooded, it is advantageous to use two or more banks of liquid-air separator strip means each having its own water collection shelf and by-pass opening toward the lower sump as described later.

As the air and water move together through the conduit, the air absorbs heat from the water through latent heat transfer. Also, where the ambient dry bulb temperature is low enough, a cooperative sensible heat transfer also takes place. In such case, because of the physical contact between the air and water, the air is heated to a higher dry bulb temperature which enables the air to hold more moisture before becoming saturated. Thus, an increased portion of the sprayed water can evaporate into the air so that the water becomes further cooled. As will be explained more fully hereinafter, the construction and arrangement of the conduit 10 is such as to obtain a substantial volume rate of air flow while maintaining a high relative velocity between the cooling air and the sprayed water, with corresponding high heat transfer between the two. Also, near the outlet end a high relative velocity is obtained by virtue of the cross flow relationship of the horizontally moving air and the downwardly flowing water on the liquid-air separator strips 28.

It will be appreciated that all of the water which impinges upon the upper bank of strips 28a flows down only to the upper water collection shelf 30. This water passes through the bypass openings 34 toward the lower water collection shelf 36 so that it bypasses the lower bank of liquid-air separator strips. Thus, the only water which flows down the lower bank of separator strips is that which is actually intercepted by them. It will also be appreciated that with this arrangement neither the upper nor the lower bank of liquid-air separator strips will become excessively flooded with water which otherwise would impair their ability to prevent the sprayed water from being carried out along with the exhaust air.

The cooled water which has flowed down the upper and lower banks of liquid-air separator strips 28 and onto the lower water collection shelf 36 passes over the edge of the shelf in the sump 42. This water then flows back along the sump and through the strainer 54 where it is cleaned of any solid particles which may have been entrained during contact with the atmospheric air drawn into the system. After passing through the strainer, the cooled water passes out of the device via the water outlet port 58.

The air flow stabilizing control strips 26 positioned upstream of the nozzles 24 serve to maintain a smooth eddy free flow of air aligned with the direction of nozzle spray so that when the air encounters the nozzle sprays it has no velocity components which detract from the pumping action of the sprays. Furthermore, this flow direction control is maintained irrespective of ambient wind direction. Thus, if any cross wind components are present, they will be eliminated by the strips 26 before the ambient air contacts the nozzle sprays. As shown, the strips 26 are arranged in planes parallel to the planes of the flat sprays from the nozzles. It will be appreciated that the sprays would be most seriously affected by cross wind components against the planes of the sprays. Thus, with the present arrangement, i.e., with the strips 26 lying in planes parallel to the planes of the flat sprays, the maximum resistance to cross wind effects is presented in the plane of maximum sensitivity of the sprays.

It occasionally happens that a strong wind is blowing either directly or nearly directly in a line from the air outlet end to the air inlet end of the device. In such case it may happen, for example, when the system is operating at low capacity and the water sprays are not of maximum intensity, that the air pumping action of the sprays is insufficient to overcome the back force of the wind. In such case, if the device were not provided with the corrugated inlet air stabilizing strips, such back flow of air would carry some of the sprayed water out through the air inlet end of the device. This disadvantage is overcome in the present invention because of the presence of the corrugations 26a in the air flow stabilizing strips 26. These corrugations cause the strips to serve as mist eliminators so that the back blown water droplets catch on them and flow down between the strip support brackets 46 and 47 and onto the strainer cover 48. This water then flows over the downstream edge of the strainer cover 48 and into the sump 42. From there it passes through the strainer 54 and out through the water outlet port 58.

It will be noted that the sprays from the uppermost and lowermost rows of nozzles impinge quite sharply against the top wall 16 and the bottom spray seal plate 18 respectively. It has been found that if the air flow in these regions is not eddy free, a mass of recirculating air will be trapped just upstream of the impingement locations. Besides interfering with and reducing normal air fow these eddys carry water droplets which can freeze and build up a coating of ice on the adjacent structure in sub-freezing ambients. The present invention overcomes this problem by virtue of the curved inlet lips 60 and 66 and the upper air inlet slot 64. Since the system is immersed in the very air which is to be driven through it, the air tends to enter the conduit 10, especially at the edges thereof, from all directions. Thus, at the immediate edges of the air inlet end of the conduit, some of the incoming air undergoes a sharp change in direction. This is illustrated in FIG. 1 at the lower edge by the arrow A and at the upper edge by the arrow B. It is this sharp turn of incoming air which could establish eddys in these regions. Now in the case of the lower edge of the conduit, because of the presence of the vertical inlet end support wall 56, the incoming air undergoes a 90° maximum direction change as illustrated by the arrow A. It has been found that the curved inlet lip 60 along the lower edge of the inlet end will serve to prevent eddys from taking place. In the case of the upper edge however, the incoming air may undergo a 180° maximum change of direction as illustrated by the arrow B. THis produces a severe tendency toward eddy formation which is more difficult to overcome than in the case of the lower edge. It has been found, however, that even this condition can be eliminated by the provision of the slot 64 downstream of the air flow stabilizing strips 26, along with the curved inlet lip 66 along the downstream edge of the slot. Besides overcoming the tendency toward eddy formation, the slot 64 permits a substantially larger quantity of air to be injected into the system by the water sprays than would otherwise be possible. Accordingly, the slot 64 also assists in increasing the cooling capacity of the system.

Figure 5:
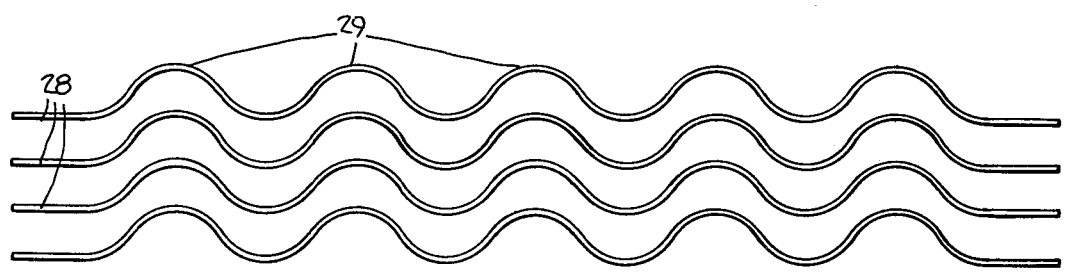
FIG. 5 is an enlarged section view taken along line 5—5 of FIG. 1.

As shown in FIG. 5 the separator strips 28 are each formed with corrugations 29. The number of corrugations, and the corresponding width of each strip, vary depending on the amount of liquid that flows down them. Thus, where the large amounts of liquid are to be separated, strips having a large number of corrugations and a corresponding width may be provided.

The relationship between corrugation height and the spacing between adjacent ones of the strips 28 has been found to be important in obtaining maximum liquid-air separation with minimum resistance to fluid flow. Thus, in the preferred embodiments a very slight but positive overlap or nesting is sufficient to intercept every portion of the liquid spray while allowing maximum spacing for free flow of air. The extended surface of the multiple corrugated strips allows the liquid caught thereon to spread out thinly as it flows down the strips so that substantially all of the liquid becomes exposed to a cross flow of air for maximum cooling.

Reverting now to FIGS. 1 and 3 it will be seen that the upper ends of the air flow stabilizing strips 26 are permanently affixed inside inner channels 70, with each channel 70 holding a group of strips. The channels 70 fit loosely but snugly inside the channel 62. Further, as can be seen in FIG. 1, an elongated flange member 72 extends horizontally along the inlet edges of the strips 26 in each group, and is permanently affixed to each strip in the group.

As seen, the flange member 72 is bent down to form a handle for lifting up on and pulling out each group of strips. The above described arrangement facilitates assembly and disassembly of the air flow stabilizing strips at the inlet end of the device. As can be seen, in assembly, the channels 70 do not extend to the top of the channel 62, but instead, a clearance C exists between the the tops of the channels 70 and 62. Each group of strips 26 may be removed as a unit simply by lifting up on its handle like flange member 72 to raise the strips so that their bottom edges clear the brackets 46 and 47. This upward movement is accomodated by the clearance C. The flange member 72 is then pulled outwardly to remove the lower ends of the group of strips, and the strips are then lowered to release their upper ends and their inner channel 70 from the channel 62. With this arrangement, ready access may be had to the manifolds 22 and the nozzles 24.

Although certain particular embodiments of the invention are herein disclosed for purpose of explanation, various modifications thereof, after study of this specification, will be apparent to those skilled in the art to which the invention pertains.

What is claimed and desired to be secured by letters patent is:

1. In combination with an injector type liquid cooling system which comprises an air conduit open at both ends to the atmosphere, a plurality of liquid spray nozzles positioned near one end of the conduit and distributed over its cross section, said nozzles being oriented to direct liquid sprays toward the other end of said conduit, liquid-air separator means positioned in said conduit near its said other end for intercepting the liquid sprayed by said nozzles and for causing said liquid to flow downwardly along said liquid-air separator means, a liquid collector sump positioned below said conduit to collect liquid which flows down from the liquid-air separator means, an inlet air flow stabilizing means for maintaining a smooth eddy free flow of incoming air comprising a plurality of straight, closely spaced parallel strips of thin sheet material extending in a generally upright position and distributed over the cross section of said one end of said conduit wholly upstream of said spray nozzles, said strips lying in planes substantially parallel to the direction of spray from said nozzles, said strips being formed with corrugations extending along their length to provide liquid-air separation in the event of fluid blowback out through said one end of the conduit 2. A combination according to claim 1 wherein said nozzles are constructed to project essentially flat, fan shaped liquid sprays.

3. A combination according to claim 1 wherein said nozzles are constructed to project essentially flat, fan shaped liquid sprays which are mutually parallel and wherein said strips lie in planes parallel to the planes of said sprays.

4. A combination according to claim 1 wherein said conduit is provided with an air control inlet slot extending across its upper surface near said one end immediately downstream of said inlet air stabilizing means.

5. A combination according to claim 4 wherein said conduit is of generally rectangular cross section.

6. A combination according to claim 5 wherein said strips extend in a generally upright position.

7. A combination according to claim 5 wherein the downstream edge of said slot is formed with an upwardly curled lip.

8. A combination according to claim 7 wherein the lower edge of said one end of said conduit is formed with a curved lip immediately upstream of said inlet air stabilizing means.

9. A combination according to claim 1 wherein said strips are held together in groups which are separately removeable from said conduit.

10. A combination according to claim 9 wherein each group of said strips is held together at its upper end by means of an inner channel.

11. A combination according to claim 10 wherein said inner channel fits loosely but snugly within an outer channel.

12. A combination according to claim 16 wherein said strips are of a length such that in assembly a clearance exists between the tops of the inner and outer channels.

13. A combination according to claim 12 wherein the lower ends of said strips rest within brackets in assembly, said brackets having a depth less than said clearance.

14. A combination according to claim 13 wherein each group of strips is also held together by means of an elongated flange extending across the outer edges of the strips.

15. A combination according to claim 14 wherein said flange is configured to form a handle.

16. In an injector type liquid cooling system which comprises an air conduit open at both ends to the atmosphere, a plurality of liquid spray nozzles positioned near one end of the conduit and distributed over its cross section, said nozzles being oriented to direct liquid sprays toward the other end of said conduit, in said conduit near its said other end, said liquid-air separator means comprising a plurality of strips distributed across the conduit cross section and arranged side by side therein in a generally upright attitude, said strips being configured and arranged to intercept liquid from the fluids flowing through said conduit and to cause said liquid to flow down toward its lower ends, said strips further being arranged in upper and lower banks, a liquid collection tray positioned along the bottom of each bank and means directing the liquid collected in the different trays into a common sump positioned below said conduit.

17. An injector type liquid cooling system according to claim 16 wherein the means directing the liquid collected in the different trays comprises bypass openings formed in the upper tray.

18. An injector type liquid cooling system according to claim 16 wherein each tray comprises a generally horizontally extending shelf with upstanding walls about its periphery.

19. An injector type liquid cooling system according to claim 16 wherein each bank of strips extends down into its respective tray.

20. An injector type liquid cooling system according to claim 16 wherein the width of the strips above each tray is related to the size of said nozzles such that the strips in each bank accommodate the liquid spray incident thereon to produce liquid-air separation without overflooding.

21. An injector type liquid cooling system according to claim 16 wherein said strips are corrugated.

22. An injector type liquid cooling system comprising an air conduit open at both ends to the atmosphere, a plurality of liquid spray nozzles positioned near one end of the conduit and distributed over its cross section, said nozzles being oriented to direct liquid sprays toward the other end of said conduit, air flow stabilizing means comprising a plurality of parallel strips distributed over the cross section near said one end upstream of said spray nozzles, liquid-air separator means positioned in said conduit near its other end, said liquid air separator means comprising a plurality of strips distributed across the conduit cross section and arranged side by side therein in a generally upright attitude, said strips being configured and arranged to intercept liquid from the fluids flowing through said conduit and to cause said liquid to flow down toward its lower ends, said strips further being arranged in upper and lower banks, a liquid collection tray positioned along the bottom of each bank and means directing the liquid collected in the different trays into a common sump positioned below said conduit.

23. An injector type liquid cooling system comprising an air conduit open at both ends to the atmosphere, the cross section of the conduit being rectangular and substantially uniform throughout its length, a plurality of liquid spray nozzles positioned near one end of the conduit and distributed over its cross section, said nozzles being oriented and configured to direct essentially flat fan shaped liquid sprays toward the other end of said conduit, air flow stabilizing means comprising a plurality of spaced apart upright strips distributed over the cross section near said one end upstream of said spray nozzles, said conduit being formed with an air inlet control slot extending across its upper surface near said one end and immediately downstream of said air flow stabilizing means, liquid-air separator means positioned in said conduit near its other end, said liquid air separator means comprising a plurality of strips distributed across the conduit cross section and arranged side by side therein in a generally upright attitude, said strips being configured and arranged to intercept liquid from the fluids flowing through said conduit and to cause said liquid to flow down toward its lower ends, said strips further being arranged in upper and lower banks, a liquid collection tray positioned along the bottom of each bank and means directing the liquid collected in the different trays into a common sump positioned below said conduit.

24. An injector type liquid cooling system comprising an air conduit open at both ends to the atmosphere, a plurality of liquid spray nozzles positioned near one end of the conduit and distributed over its cross section, said nozzles being oriented to direct liquid sprays toward the other end of said conduit, air flow stabilizing means comprising a plurality of parallel strips distributed over the cross section near said one end upstream of said spray nozzles, liquid-air separator means positioned in said conduit near its other end, said liquid air separator means comprising a plurality of strips distributed across the conduit cross section and arranged side by side therein in a generally upright attitude, said strips being configured and arranged to intercept liquid from the fluids flowing through said conduit and to cause said liquid to flow down toward its lower ends, said strips further being arranged in upper and lower banks, a liquid collection tray positioned along the bottom of each bank, each tray comprising a generally horizontally extending shelf with upstanding walls about its periphery and the upper trays being formed with bypass openings through which liquid collected therein may flow directly into a common sump positioned below said conduit.

25. An injector type liquid cooling system comprising an air conduit open at both ends to the atmosphere, the cross section of the conduit being rectangular and substantially uniform throughout its length, a plurality of liquid spray nozzles positioned near one end of the conduit and distributed over its cross section, said nozzles being oriented and configured to direct essentially flat fan shaped liquid sprays toward the other end of said conduit, air flow stabilizing means comprising a plurality of spaced apart upright strips distributed over the cross section near said one end upstream of said spray nozzles, said conduit being formed with an air inlet control slot extending across its upper surface near said one end immediately downstream of said air flow stabilizing means, liquid-air separator means positioned in said conduit near its other end, said liquid air separator means comprising a plurality of strips distributed across the conduit cross section and arranged side by side therein in a generally upright attitude, said strips being configured and arranged to intercept liquid from the fluids flowing through said conduit and to cause said liquid to flow down toward its lower ends, said strips further being arranged in upper and lower banks, a liquid collection tray positioned along the bottom of each bank, each tray comprising a generally horizontally extending shelf with upstanding walls about its periphery and the upper tray being formed with bypass openings through which liqid collected therein may flow directly into a common sump positioned below said conduit.

* * * * *

UNITED STATES PATENT AND TRADEMARK OFFICE
CERTIFICATE OF CORRECTION

PATENT NO. : 3,922,153
DATED : Nov. 25, 1975
INVENTOR(S) : John Engalitcheff, Jr., Wilson E. Bradley, Jr. and Edward N. Schinner It is certified that error appears in the above-identified patent and that said Letters Patent are hereby corrected as shown below:

In claim 16, column 9, line 33 following "the other end of said conduit," insert the following:

"--the combination of liquid-air separator means positioned--"

Signed and Sealed this sixth Day of April 1976

[SEAL]

Attest:

RUTH C. MASON
Attesting Officer

C. MARSHALL DANN
Commissioner of Patents and Trademarks